(12) United States Patent
Schiemann et al.

(10) Patent No.: US 11,742,532 B2
(45) Date of Patent: Aug. 29, 2023

(54) PROCESS MEDIUM GUIDING APPARATUS FOR A RECOMBINATION SYSTEM

(71) Applicant: BAE BATTERIEN GMBH, Berlin (DE)

(72) Inventors: Michael Schiemann, Falkensee (DE); Julia-Beatrix Ross, Berlin (DE)

(73) Assignee: BAE BATTERIEN GMBH, Berlin (DE)

( * ) Notice: Subject to any disclaimer, the term of this patent is extended or adjusted under 35 U.S.C. 154(b) by 273 days.

(21) Appl. No.: 17/265,652

(22) PCT Filed: Aug. 5, 2019

(86) PCT No.: PCT/EP2019/071017
§ 371 (c)(1),
(2) Date: Feb. 3, 2021

(87) PCT Pub. No.: WO2020/030586
PCT Pub. Date: Feb. 13, 2020

(65) Prior Publication Data
US 2021/0305637 A1   Sep. 30, 2021

(30) Foreign Application Priority Data

Aug. 8, 2018 (DE) .................... 10 2018 119 303.3

(51) Int. Cl.
*H01M 10/52* (2006.01)
*H01M 50/392* (2021.01)
(Continued)

(52) U.S. Cl.
CPC ......... *H01M 10/523* (2013.01); *H01M 10/06* (2013.01); *H01M 50/308* (2021.01);
(Continued)

(58) Field of Classification Search
CPC ...... H01M 10/52; H01M 10/05; H01M 10/06; H01M 50/392; H01M 50/308
See application file for complete search history.

(56) References Cited

U.S. PATENT DOCUMENTS 3,929,422 A * 12/1975 Kreidl .................. B01J 35/02
422/634
4,378,413 A * 3/1983 Winsel .................. H01M 10/52
429/86
(Continued)

FOREIGN PATENT DOCUMENTS

DE          2 050 642 A   6/1971
DE   20 2018 1 00 892 U   2/2018
(Continued)

OTHER PUBLICATIONS

International Search Report dated Oct. 29, 2019, in connection with PCT International Application No. PCT/EP2019/071017.
English translation of International Search Report dated Oct. 29, 2019, in connection with PCT International Application No. PCT/EP2019/071017.
(Continued)

*Primary Examiner* — Kenneth J Douyette
(74) *Attorney, Agent, or Firm* — Norris McLaughlin, P.A.

(57) ABSTRACT

The invention relates to a process medium guiding apparatus for a recombination system having a recombination device for the catalytic recombination of hydrogen and oxygen created in accumulators to form water. According to the invention, a process medium guiding apparatus for a recombination system having a recombination device for the catalytic recombination of hydrogen and oxygen created in accumulators to form water is to be provided. The process medium guiding apparatus is designed such that the recombination system is limited towards the outside and comprises at least one guiding element. The guiding element is (Continued)

Figure 1:
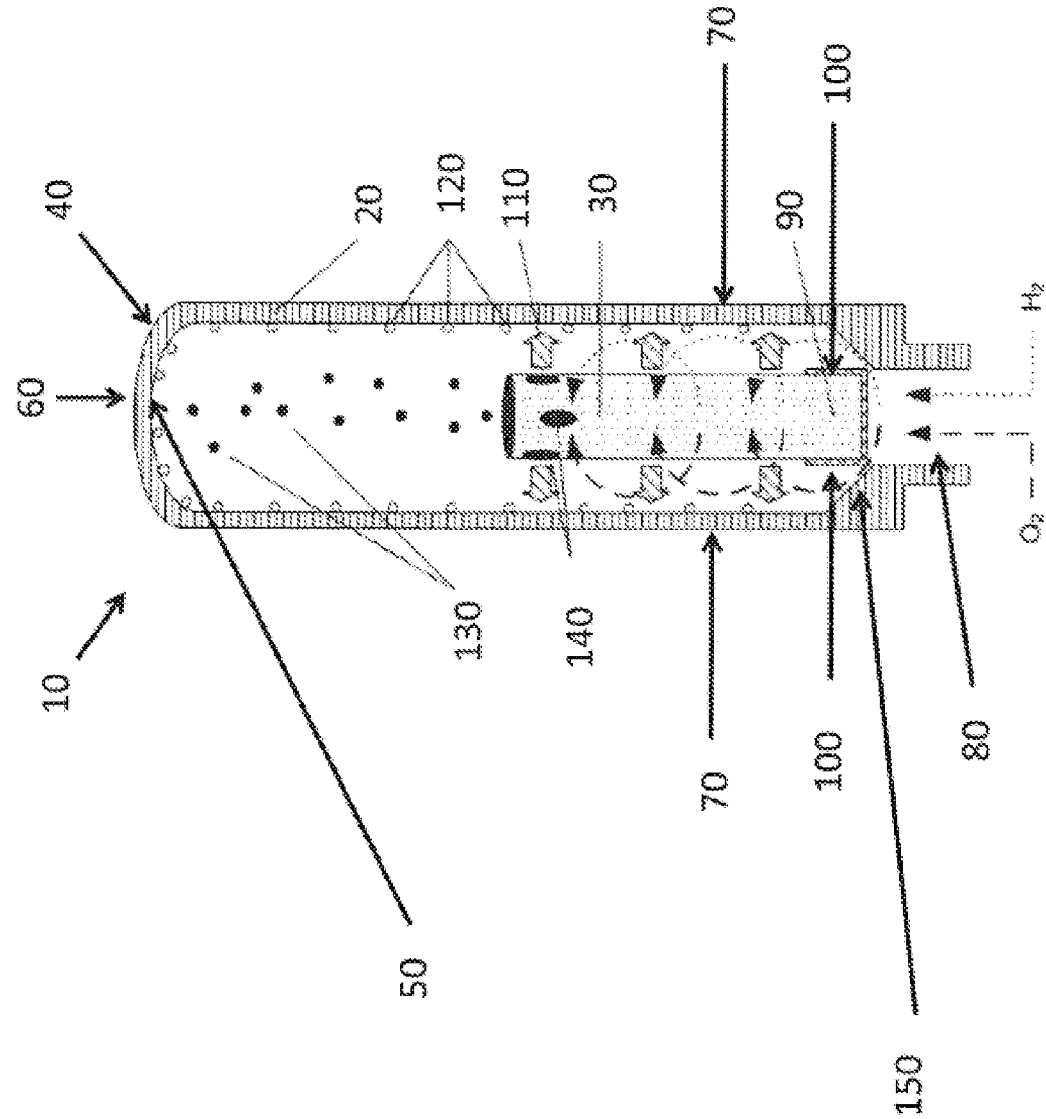

arranged above the recombination device, so that a process medium, more particular water, is guided from the process medium guiding apparatus to at least a partial region of an interior region of the recombination system.

11 Claims, 3 Drawing Sheets

(51) Int. Cl.
*H01M 50/308* (2021.01)
*H01M 50/317* (2021.01)
*H01M 10/06* (2006.01)
*H01M 50/35* (2021.01)

(52) U.S. Cl.
CPC ......... *H01M 50/317* (2021.01); *H01M 50/35* (2021.01); *H01M 50/392* (2021.01)

(56) References Cited

U.S. PATENT DOCUMENTS

| | | | |
|---|---|---|---|
| 6,254,841 B1 * | 7/2001 | Kesper | H01M 50/394 422/211 |
| 2018/0114965 A1 | 4/2018 | Doyle et al. | |

FOREIGN PATENT DOCUMENTS

| | | |
|---|---|---|
| EP | 1 780 826 A1 | 5/2007 |
| EP | 1 807 191 B1 | 1/2017 |
| EP | 2 936 585 B1 | 7/2017 |
| WO | 2017/191848 A1 | 11/2017 |

OTHER PUBLICATIONS

Written Opinion issued in connection with PCT International Application No. PCT/EP2019/071017.

* cited by examiner

PROCESS MEDIUM GUIDING APPARATUS FOR A RECOMBINATION SYSTEM

This application is the U.S. National Stage of International Application No. PCT/EP2019/071017, filed Aug. 5, 2019, which claims foreign priority benefit under 35 U.S.C. § 119 of German Application No. 10 2018 119 303.3, filed Aug. 8, 2018.

The invention relates to a process medium guiding apparatus for a recombination system having a recombination device for the catalytic recombination of hydrogen and oxygen created in accumulators to form water.

Storage batteries are in widespread use and are employed as rechargeable storage devices for electrical energy on the basis of electrochemical properties. The application spectrum of lead-acid technology is very broad, starting from simple starter batteries as car power supply and starter motor battery, this technology is also deployed in uninterruptible power supplies in parallel standby operation as backup power supplies, in photovoltaic plants, and in traction systems for shop floor material handling vehicles in cycled operations.

An attribute of sealed lead-acid storage batteries is the loss of water. Due to the electrochemical properties, the water in the electrolyte of the storage battery decomposes into oxygen and hydrogen, causing the electrolyte level in the individual sealed cells to drop, thus mandating a battery space ventilation mechanism. The water decomposition is firstly caused by the low water decomposition voltage (1.223 V water decomposition voltage), and secondly, when the gasification voltage of 2.40 V per cell is exceeded, the electrolysis in lead-acid storage batteries results in water decomposition in conjunction with the rise of gas bubbles.

This causes hydrogen, a gas that is combustible but does not promote the combustion, to accumulate on the negative electrode. Conversely, oxygen forms on the positive electrode in the stoichiometric ratio of 1:2. Due to the low solubility of both gases in the electrolyte, the gas bubbles dissipate through the filling and gas dissipation plug.

The two gases can be combined with each other, both within, but also outside of the battery body. Oxygen and hydrogen are recombined into water already at room temperature. But this happens at such a slow, barely measurable speed, that a hydrogen oxygen mixture can be stored for months without the ability to measure a conversion.

In total, the disadvantages of water decomposition and the associated maintenance effort for lead-acid accumulators, but also for other battery technologies, such as nickel-iron or nickel-cadmium (that is to say for many battery technologies based on an aqueous electrolyte) were already identified at an early stage (such as by Mr. Edison in 1904), and attempts were made based on various development stages to overcome these disadvantages.

For example, it was determined that the recombination process of hydrogen and oxygen gas is accelerated with the assistance of catalysts (such as platinum). Catalysts are generally defined as substances that can increase or decrease the speed of a chemical reaction. Since catalysts are not consumed in the process, they are present in unmodified form at the end of the reaction and are therefore also not shown in the reaction equations of the conversion. The acceleration is realized by reducing the activation energy. The inhibited reaction of oxygen and hydrogen can as a result be accelerated.

The freely moving hydrogen molecules contact the surfaces of the catalyst material. The freely moving electrons stored there break the bonds, bond with the individual hydrogen atoms, and allow the latter to freely move along the surface. The also freely moving oxygen molecules land on the platinum surface, and as individual atoms form a bond with respectively two hydrogen atoms. The resulting recombination then generates two water molecules from one oxygen molecule and two hydrogen molecules.

The recombination of oxygen and hydrogen into water releases energy manifested in the form of high heat development (193 kJ/mol), allowing the water molecules to leave the platinum catalyst. The split substances were recombined by recombination with the aid of a catalyst.

Without limitation, external catalytic plugs that rely on this effect were also developed for recombination. When using the recombination system, the hydrogen and oxygen gases arising in the battery during water decomposition are routed into the recombiner, which is arranged on the opening of the lead-acid battery.

Using an integrated precious metal catalyst that is contained in a gas-permeable ceramic, these gases are recombined, resulting in water vapor. The water vapor condensates on the walls of the plug. The forming water droplets flow downward and are routed back to the battery.

The downward flow of water presents the problem that condensing water droplets can also after condensation settle in the upper region of the dome. This entails the possibility that these water droplets can form in the upper region of the dome. When the droplets detach from the upper region of the dome and wet the gas-permeable ceramic with integrated precious metal condenser, the pores of the ceramic are wetted and "plugged", and are as a result no longer available for transporting gas. The reduced gas permeability caused by the clogged pores contributes towards significantly reducing the efficiency of these plugs.

This problem is already known, and the prior art has proposed various solutions.

Document EP 1 807 191 B1 for example discloses a recombiner having a recombination device for catalytically recombining hydrogen and oxygen generated in accumulators to form water. In this case, a shield element is specified above the recombination apparatus that is designed to collect water forming on a container wall of a container of the recombiner in order to address the aforementioned problem. Various shield elements are proposed for this purpose that are inserted between the condensation walls and the gas-permeable ceramic. The fact that an additional element must be obtained, along with the associated additional costs, can be seen as disadvantages of these solutions. Additionally, the design must then realize the clamping in the cylinder. This results in increased assembly effort.

Document EP 2 936 585 B1 also discloses a known gas recombiner cap. The publication proposes to address the aforementioned problem with a drip cap located in the upper region of a condensation cylinder of the gas recombiner cap in order to collect condensing water there. The additional costs of an additional element and a design based adaptation of the entire concept must again be seen as disadvantages.

The invention is then based on the task to create a cost-effective and practical apparatus for a recombination system that ensures safe operation of process media in the system.

A preferred embodiment of the invention specifies a process medium guiding apparatus for a recombination system for catalytically recombining hydrogen and oxygen created in accumulators to form water. The process medium guiding apparatus is in this case designed to limit the recombination system to the outside, comprising at least one guide element that is arranged above the recombination device such that a process medium, in particular water, is guided by the process medium guiding apparatus to at least one sub region of an inner region of the recombination system. The proposed apparatus can be particularly easily realized and is therefore not particularly cost-intensive to manufacture. The process medium, in particular water, is reliably routed such that unintended wetting with the medium of the recombination device, which for example comprises a ceramic, is prevented, such that a recombination efficiency is maintained.

Other preferred embodiments of the invention are specified by the further features disclosed in the dependent claims.

A further preferred embodiment of the invention specifies that the process medium guiding apparatus forms a single piece with the at least one sub region of the inner region of the recombination system, or is formed as a detachable assembly component unit that can be joined to the at least one sub region of the inner region of the recombination system. Both versions represent a reduced assembly effort, such that a practical apparatus for a recombination system can be readily provided and that ensures safe operation of process media in the system. The assembly component unit and the sub region of the inner region of the recombination system can be designed to be joined using a plug connection, or using a threaded, socket or bayonet lock. A combination of the various joining methods is likewise conceivable.

A further preferred embodiment of the invention also specifies that the assembly component unit essentially has the form of a locking element, wherein the guide element is specified on a bottom side of the assembly component unit and wherein the assembly component unit can be mechanically engaged or threaded onto the recombination system or can be engaged onto the recombination system with a bayonet lock, such that at least a sub region of the guide element can be joined to the at least one sub region of an inner region of the recombination system.

The locking element can for example have the form of a plug. But other forms and embodiments of the locking element are likewise conceivable. The socket system in this case provides reduced assembly effort, such that a simple and practical apparatus is provided.

The locking element can have a sealing element (injection molded sealing lip).

A further preferred embodiment of the invention additionally specifies that the guide element has a circular-conical, elliptical-conical or pyramid-shaped (rectangular surface) design feature, wherein a largest radius of the design feature is at least partially arranged along a perimeter region on the at least one sub region of the inner region of the recombination system. Such a conical superstructure above the recombination device reliably and easily prevents that a process medium, in particular water, reaches components of the recombination device, such as a porous ceramic, located underneath. The conical superstructure can be regarded as a drainage of the medium, for example condensing water, wherein a lateral evacuation of the medium is favored, such that dropping of for example condensing water onto a component, for example a ceramic, is reliably prevented. A design having a meander-shaped design of the inner cylinder surface is likewise conceivable.

As specified by the invention, the creation of a circular conical design feature of the upper region of the recombination system, which can also be referred to as a dome or condensation dome or condensation cylinder, can generate significant advantages in the cost structure because the assembly effort is minimized.

In a special embodiment, a surface-mounted plug can be used in the upper region of the recombination system in place of a partial feature of the dome, wherein the surface-mounted plug seals the upper region on top. On the bottom side, the plug has a correspondingly shaped conical cutout that promotes drainage of the condensing water. Although the surface-mounted plug represents an additional part for the recombiner, it is significantly easier in terms of assembly than previously known solutions. The conically shaped surface-mounted plug is in this regard suited for better drainage of the condensing water, wherein the water subsequently drains for example on the inner perimeter of the dome, which is likewise designed for condensation. The locking element or the plug can also be referred to as a circular-conical plug for a recombination system.

A further preferred embodiment of the invention additionally specifies that a tip of the circular conical shape is essentially aligned centered above and below the recombination device. The aforementioned advantages can then be implemented even better.

A further preferred embodiment of the invention specifies that the at least one sub region of the inner region of the recombination system is at least partially an inner region of a condensation cylinder. As a result, the condensing medium can be easily guided to a perimeter, where it ultimately cannot interfere with a reliable and efficient operation of the system.

A further preferred embodiment of the invention additionally specifies that the guide element comprises at least one retaining element that is designed to hold the recombination device. Based on this approach, no additional securing elements are needed, thus ensuring even easier assembly.

A further preferred embodiment of the invention additionally specifies that a version has a conical angle of 5° to 45°. The aforementioned advantages can then be implemented even better. In all proposed embodiments, the angle of the cone can be varied such that the drainage of the medium, for example of condensing water, is correspondingly optimized.

A further preferred embodiment of the invention additionally specifies that the guide element has at least one rib element. The aforementioned advantages can then be implemented even better. In other words, the interior of the circular cylinder can be formed with ribs or rib elements, such that both the condensation itself but also the drainage, for example of condensing water, is additionally 3 promoted. This embodiment is in this case possible both for the additional plug but also in a single piece version, for example in a special dome embodiment. Both embodiments have in common that the cone—whether embodied in the dome or as an additional surface-mounted plug—is always located above the recombination device or components of the latter, for example a gas-permeable ceramic. The wetting of the gas-permeable ceramic is as a result effectively prevented.

A further preferred embodiment of the invention specifies that the process medium guiding apparatus has at least one region designed to accommodate at least one backfire safety element. Based on this approach, further assembly steps can be combined, thus providing an even easier design of the proposed apparatus.

A final further preferred embodiment of the invention specifies that the process medium guiding apparatus has an at least labyrinth-like opening designed to functionally join the at least one backfire safety element to the recombination device. In other words, the device can in a special embodiment as specified by the invention comprise a plug opening that for purposes of pressure compensation features a meander-shaped canal that decelerates the gas outflow to provide more time for the hydrogen-oxygen mixture to correspondingly penetrate into for example a ceramic, porous tube with precious metal condenser. In addition, the plug can accordingly on the outlet have said region for a backfire safety element. A backfire safety element can also be specified to prevent or minimize the risk of backfiring in the recombination plug from the outside due to sparks or open flame occurring.

Unless stated otherwise in the individual case, the various embodiments of the invention described in this filing can be advantageously combined.

Figure 2:
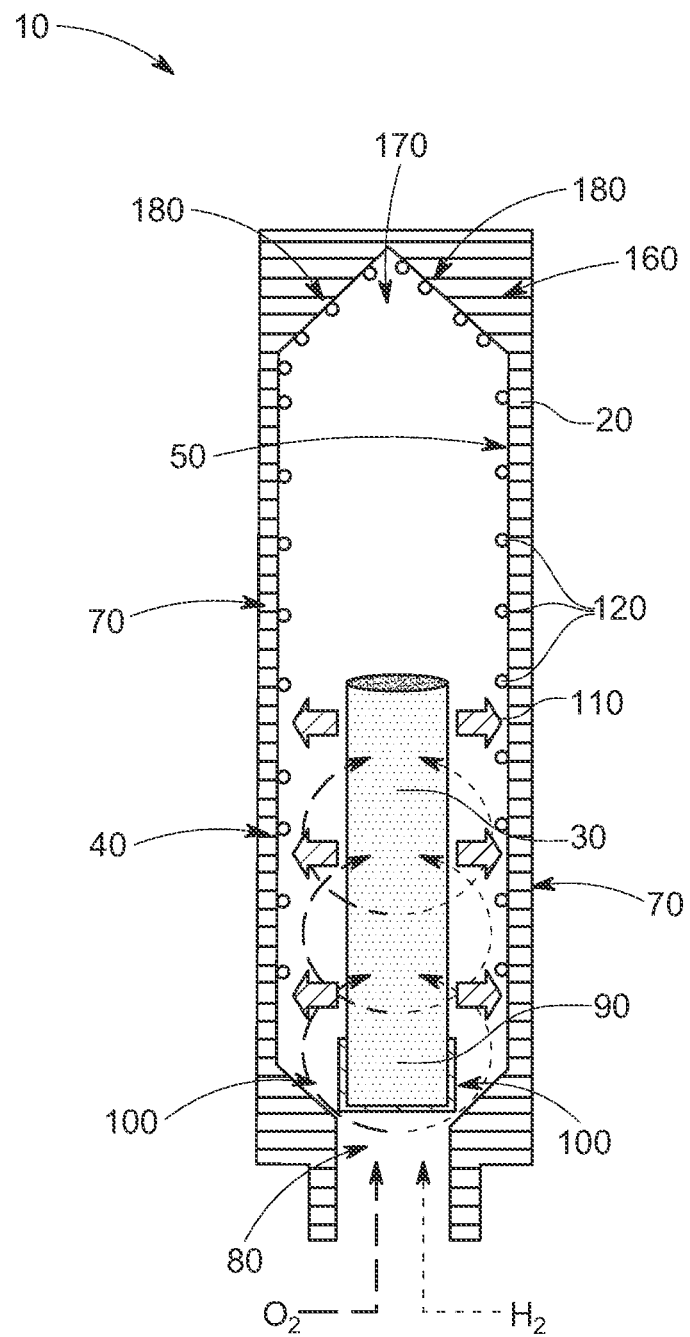
Figure 3:
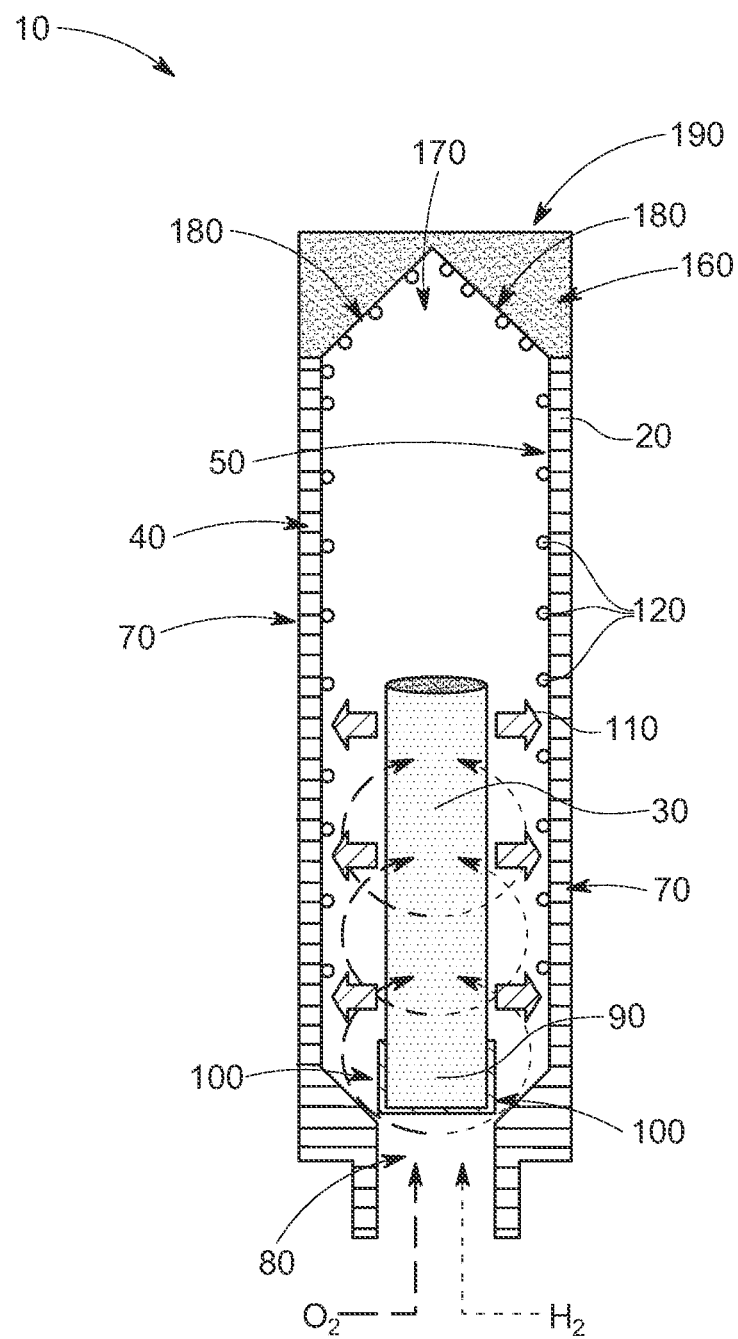

The invention is discussed as follows in exemplary embodiments based on the associated drawings. These show in FIG. 1 A cross-section view of a recombination system;

FIG. 2 A cross-section view of a recombination system with single-piece process medium guiding apparatus;

FIG. 3 A cross-section view of a recombination system with a detachably joined process medium guiding apparatus.

FIG. 1 shows a cross-sectional view of a recombination system 10, as it could for example be represented according to the prior art. The recombination system 10 in this case comprises a dome 20 and a recombination device 30. The dome 20 is in this example shown as an essentially rectangular, hollow and cylindrical geometry. The dome 20 in this case has an outer wall 40 and an inner wall 50. In relation to the image plane, the dome 20 has rounded corner regions on top, so that a ceiling region 60 transitions in an arc shape into the side walls 70. Again in relation to the image plane, the dome 20 has an opening region 80 on the bottom into which the O2 and H2 gases flow. These gas flows are each schematically represented with respectively different hatched lines, wherein arrows indicate that these gases flow from below into an interior of the dome 20.

A retainer 90 can be seen above the opening region 80. The recombination device 30 is held upright in the retainer 90, which can also be referred to as a securing mechanism. Two jaw elements 100 of the retainer 90 hold the recombination device 30 in an upright position. The recombination device 30 has an essentially cylindrical geometry. All shown geometries, dimensions and size relationships are to be strictly interpreted as examples and are merely to be understood as a schematic arrangement. The recombination device 30 is shown in this example as a gas-permeable ceramic having an integrated precious metal catalyst, and can also be referred to as a ceramic tube. The respectively different hatched lines of the two gases are shown as circular shapes in the interior of the dome 20 and point with the arrow tip to the ceramic tube. Block arrows point away from the ceramic tube and visualize the resulting water vapor 110. The water vapor 110 condenses on the inner wall 50 to condensed water 120. In this respect, the dome 20 is designed for condensing the water vapor 110. In the upper region of the dome 20, water vapor 110 also condenses in the ceiling region 60. The gravity principle states that it is possible that condensed water 110 in the form of water droplets 130 falls in the direction of the recombination device 30. Not shown water spots 140 can therefore occur on the recombination device 30.

In other words, the ceramic is wetted with condensed water 120, so that the efficiency of the recombination device 30 is reduced as a result. Instead of draining downward along the inner wall 50 and draining through the funnel-shaped bottom of region 150 of the recombination system 10, it is possible that a part of the condensed water 120 drips onto or reaches the recombination device 30 or parts of the recombination device 30, thus reducing the efficiency of the recombination device 30.

FIG. 2 shows a cross-section view of a recombination system 10 having a single piece process medium guiding apparatus 160. In the bottom region in relation to the image plane, the recombination system 10 has a similar design as the recombination system 10 in FIG. 1. Here as well, a recombination device 30 is shown that is held upright in a retainer 90 with two jaw elements 100. In the bottom region, an opening region 80 is additionally shown, through which the two gases O$_2$ and H$_2$ flow (again shown by two different dotted lines). The two gases flow about the recombination device 30, indicated by the circular dotted lines, wherein here as well the recombination device 30 has a ceramic tube or a gas-permeable ceramic with integrated precious metal catalyst.

The recombination device 30 shown in FIG. 2 is also designed to combine the two gases to form water vapor 110 (again shown by block arrows). The recombination system 10 shown in FIG. 2 in this case also comprises a dome 20. The dome 20 is in this example also shown as an essentially rectangular, hollow, and cylindrical geometry. The dome 20 in this case has an outer wall 40 and an inner wall 50. The dome 20 in this case also has side walls 70. All shown geometries, dimensions and size relationships are here as well to be strictly interpreted as examples and are merely to be understood as a schematic arrangement. As already stated, block arrows point away from the ceramic tube and visualize the resulting water vapor 110. The water vapor 110 condenses on the inner wall 50 to condensed water 120. In this respect, the dome 20 is designed for condensing the water vapor 110. In relation to the image plane, the process medium guiding apparatus 160 seamlessly adjoins the side walls 70 of the dome 20 as a single piece. The process medium guiding apparatus 160 in this case comprises a guide element 170 that is oriented toward an interior of the dome 20. The guide element 170 represents a conical geometry that is oriented such that a tip is essentially oriented centered above the recombination device 30. Condensing water can be seen on the inner walls 180 of the guide element 170. The inner wall 180 of the guide element 170 seamlessly transitions into the inner wall 50 of the sidewalls 70 of the dome 20.

In other words, the process medium guiding apparatus 160 is designed as a single piece with the dome 20, wherein the guide element 170 is designed in the form of a conical geometry in order to route the condensing water vapor 120 according to the gravity principle toward the inner walls 50 of the dome 20. These inner walls 50 of the dome 20 can also be referred to as a sub region of an inner region of the recombination system 10.

The water 120 or the water vapor 110 can also be referred to as process medium. The process medium guiding apparatus 160 externally represents an extension of the outer walls 40 of the dome 20, wherein an essentially rectangular geometry can be seen in the upper region. This external geometry can be arbitrarily adapted to the respective application.

FIG. 3 shows a cross-section view of a recombination system 10 having a detachably joinable process medium guiding apparatus 160. In the bottom region in relation to the image plane, the recombination system 10 has a similar design as the recombination system 10 in FIG. 1. Here as well, a recombination device 30 can be seen that is held upright in a retainer 90 with two jaw elements 100.

In addition, an opening region 80 can be seen in the bottom region, through which the two gases $O_2$ and $H_2$ flow (again shown by two different dotted lines). The two gases flow about the recombination device 30, indicated by the circular hatched lines, wherein here as well the recombination device 30 has a ceramic tube or a gas-permeable ceramic with integrated precious metal catalyst.

The recombination device 30 shown in FIG. 3 is also designed to combine the two gases to form water vapor 110 (again shown with a block arrows). The recombination system 10 shown in FIG. 3 in this case also comprises a dome 20. The dome 20 is in this example also shown as an essentially rectangular, hollow and cylindrical geometry. The dome 20 in this case has an outer wall 40 and an inner wall 50. Here as well, the dome 20 has side walls 70. All shown geometries, dimensions and size relationships are here as well to be strictly interpreted as examples and are merely to be understood as a schematic arrangement. As already stated, block arrows point away from the ceramic tube and visualize the resulting water vapor 110. The water vapor 110 condenses on the inner wall 50 to condensed water 120. In this respect, the dome 20 is designed for condensing the water vapor 110. The process medium guiding apparatus 160 in this case comprises a separate assembly component unit 190 that in the positioned state seamlessly transitions into the sidewalls 70 of the dome 20. The process medium guiding apparatus 160 in this case comprises a guide element 170 that is oriented toward an interior of the dome 20. The guide element 170 represents a conical geometry that is oriented such that a tip is essentially oriented centered above the recombination device 30. Condensing water can be seen on the inner walls 180 of the guide element 170. The inner wall 180 of the guide element 170 seamlessly transitions into inner wall 50 of the sidewalls 70 of the dome 20. The detachable version of the process medium guiding apparatus 160 can also be referred to as a surface-mounted plug for better drainage of the condensing water.

REFERENCE SYMBOLS

10 Recombination system
20 Dome
30 Recombination device
40 Outer wall
50 Inner wall
60 Ceiling region
70 Sidewall
80 Opening region
90 Retainer
100 Jaw element
110 Water vapor
120 Water
130 Water drops
140 Water spots
150 Bottom region
160 Process medium guide apparatus
170 Guide element
180 Inner wall
190 Assembly component unit

The invention claimed is:

1. A process medium guiding apparatus for a recombination system having a recombination device for catalytically recombining hydrogen and oxygen generated in accumulators to form water, wherein the process medium guiding apparatus is designed to limit the recombination system to the outside and comprising at least one guide element arranged above the recombination device such that a process medium, in water, is guided by the process medium guiding apparatus to the at least one sub region of an inner region of the recombination system.

2. The process medium guiding apparatus of claim 1, wherein the process medium guiding apparatus is formed as a single piece with the at least one sub region of the inner region of the recombination system, or is formed as a detachable assembly component unit that is joinable to the at least one sub region of the inner region of the recombination system.

3. The process medium guiding apparatus of claim 2, wherein the assembly component unit essentially comprises a form of a locking element, wherein the guide element is specified on a bottom side of the assembly component unit, and wherein the assembly component unit is mechanically mountable or threadable onto the recombination system such that at least a sub region of the guide element is joinable to the at least one sub region of an inner region of the recombination system.

4. The process medium guiding apparatus of claim 1, wherein the guide element has a circular conical, elliptical or pyramid-shaped design feature, wherein the design feature is arranged on a perimeter region with a largest radius of the design feature at least partially on the at least one sub region of the inner region of the recombination system.

5. The process medium guiding apparatus of claim 4, wherein a tip of the circular conical design feature is oriented essentially centered above and over the recombination device.

6. The process medium guiding apparatus of claim 1, wherein the at least one sub region of the inner region of the recombination system is at least partially an inner region of a condensation cylinder.

7. The process medium guiding apparatus of claim 1, wherein the guide element comprises at least one retainer element that is designed to hold the recombination device.

8. The process medium guiding apparatus of claim 1, wherein an embodiment of a cone angle is 5° to 45°.

9. The process medium guiding apparatus of claim 1, wherein the guide element has at least one rib element.

10. The process medium guiding apparatus of claim 1, wherein the process medium guiding apparatus has at least one region designed to accommodate at least one backfire safety elements.

11. The process medium guiding apparatus of claim 10, wherein the process medium guiding apparatus comprises at least one labyrinth-shaped opening designed to functionally join the at least one backfire safety element to the recombination device.

* * * * *